US008010805B2

(12) United States Patent
Gervais et al.

(10) Patent No.: US 8,010,805 B2
(45) Date of Patent: Aug. 30, 2011

(54) SECURE PORTING OF INFORMATION FROM ONE DEVICE TO ANOTHER

(75) Inventors: John Alan Gervais, Carmel, IN (US); Mike Arthur Derrenberger, Fishers, IN (US)

(73) Assignee: Thomson Licensing, Boulogne Billancourt (FR)

( * ) Notice: Subject to any disclaimer, the term of this patent is extended or adjusted under 35 U.S.C. 154(b) by 334 days.

(21) Appl. No.: 10/582,676

(22) PCT Filed: Jan. 6, 2004

(86) PCT No.: PCT/US2004/000072
§ 371 (c)(1),
(2), (4) Date: Jun. 12, 2006

(87) PCT Pub. No.: WO2005/069105
PCT Pub. Date: Jul. 28, 2005

(65) Prior Publication Data
US 2007/0150734 A1  Jun. 28, 2007

(51) Int. Cl.
G06F 12/14 (2006.01)
G06F 21/00 (2006.01)
G06F 17/30 (2006.01)
H04L 29/06 (2006.01)
H04L 9/32 (2006.01)
H04L 9/00 (2006.01)
H04N 7/167 (2006.01)
H04K 1/00 (2006.01)

(52) U.S. Cl. ........ 713/193; 713/151; 713/156; 713/161; 713/165; 713/168; 713/185; 713/187; 726/9; 726/10; 726/20; 726/26; 380/201; 380/255; 380/277

(58) Field of Classification Search .................. 713/193, 713/151, 156, 161, 165, 168, 185, 187; 726/9, 726/10, 20, 26; 380/201, 255, 277
See application file for complete search history.

(56) References Cited

U.S. PATENT DOCUMENTS
5,761,309 A * 6/1998 Ohashi et al. ................. 713/156
(Continued)

FOREIGN PATENT DOCUMENTS
EP    1 376 303 A2    1/2004
(Continued)

OTHER PUBLICATIONS
Network Associates: "How PGP works" PGP 6.5.1 Documentation, Dec. 2003 XP002302290 p. 5. 9 retrieved from the Internet: URL;http://web.archive.org/web/20031205055.
(Continued)

Primary Examiner — Aravind K Moorthy
(74) Attorney, Agent, or Firm — Robert D. Shedd; Paul P. Kiel

(57) ABSTRACT

A generic access card is paired with a data destination device by insertion into its card slot, and the public portion of a public/private key is stored in the card. The card authenticates the destination device. The paired card is transported to a data source device which includes a card slot and a removable mass storage medium. The card, when inserted into the card slot of the data source and authenticated, transfers the public key to the source device. The source device generates content encoding keys, and encodes the data on the storage medium. The content encoding keys are encoded using the public key, and loaded onto the card. The card and the storage medium are transported to the destination device, where the card provides the encoded encryption keys. The destination device decodes the encrypted content encryption key(s) and decodes the encrypted data for playback or display.

13 Claims, 5 Drawing Sheets

U.S. PATENT DOCUMENTS

| | | | |
|---|---|---|---|
| 6,826,690 B1 * | 11/2004 | Hind et al. | 713/186 |
| 7,080,039 B1 * | 7/2006 | Marsh | 705/51 |
| 7,730,300 B2 * | 6/2010 | Candelore | 713/155 |
| 2002/0076051 A1 | 6/2002 | Nii | |
| 2003/0028734 A1 * | 2/2003 | March et al. | 711/154 |
| 2003/0046544 A1 * | 3/2003 | Roskind et al. | 713/176 |
| 2005/0123142 A1 * | 6/2005 | Freeman et al. | 380/277 |

FOREIGN PATENT DOCUMENTS

| | | |
|---|---|---|
| JP | 2003-134102 | 5/2003 |
| JP | 2003-216500 | 7/2003 |
| WO | WO90/12357 | 10/1990 |

OTHER PUBLICATIONS

Thomson: "SmartRight TM, Technical white paper, version 1.7" Jan. 2003, pp. 1-19 XP002301891.

Search Report dated Oct. 25, 2004.

* cited by examiner

US 8,010,805 B2

SECURE PORTING OF INFORMATION FROM ONE DEVICE TO ANOTHER

FIELD OF THE INVENTION

This application claims the benefit, under 35 U.S.C. §365 of International Application PCT/US04/00072 filed Jan. 6, 2004, which was published in accordance with PCT Article 21(2) on Jul. 28, 2005 in English.

BACKGROUND OF THE INVENTION

It is often desirable or convenient to transport audio or video information from one device to another. For example, music stored on a home device may be copied to a medium for playing in an automobile. In the past, such a transfer of music might be accomplished by recording from an analog vinyl disk onto an audio cassette which could be played in the automobile. The owners of the copyrights in the music material could be reasonably sure that the music could not be usefully replicated to many generations, because inexact analog reproduction and the multiplication of noise would degrade the quality of the performance after a few generations.

With the advent of digital recording and storage, the potential exists for the making of many generations of essentially perfect copies of information, be it audio or video. Various schemes have been suggested and implemented in attempts to limit the unauthorized copying of digitally recorded entertainment media.

Improved and/or alternative arrangements are desired for secure porting of digital information.

SUMMARY OF THE INVENTION

A method according to an aspect of the invention is for securely porting or transferring digital information from a source of digital information to a destination device. The source device includes a removable digital memory including a port at which the digital information can be accessed. The source device also includes a stored first Conditional Access Certificate and also includes an access card port or slot. A destination device includes a digital information port which is capable of receiving the digital information, and further includes an access card port or slot. The destination device further includes a stored second User Certificate, and also includes mutually corresponding private and public encryption keys associated with the destination device. An access card is provided, which is capable of use with both the source device and the destination device. The access card includes a second Conditional Access Certificate and a first User Certificate stored therein. After the placing of the access card in the access card port of the destination device a first time, the User certificate in the destination device is accessed by the access card, and, within the access card, the second User Certificate from the destination device is authenticated using the second Conditional Access Certificate from the access card, to determine if the public encryption key from the destination device should be written to the access card. In a preferred embodiment, the public encryption key is not written to the access card if the access card already contains a public key from any destination device. If it is determined that the public encryption key of the destination device should be written to the access card, the public encryption key from the destination device is written to the access card. The access card is removed from the destination device after the writing of the public encryption key. The access card is then inserted into the access card port of the source device. At least the first Conditional Access Certificate stored in the source device is used to determine if the first User Certificate stored in the access card is valid. If the access card is deemed to be valid by the source device, the public encryption key is copied from the access card to the source device. At the source device, at least some of the digital information in the digital memory is encrypted using at least one content encryption key to produce encrypted information. At least one content encryption key is encrypted using the public key portion of the public/private encoding key pair from the destination device. The least one encrypted content encryption key is stored in the access card. The port of the digital memory is connected to the digital information port of the destination device. The access card is placed in the access card port of the destination device a second time. Then the encrypted content encryption key is copied from the access card to the destination device, and decrypted using the destination device's private key. The encrypted information from the digital memory is received at the destination device, and decrypted using the decrypted content encryption key.

In a particularly advantageous embodiment, the Conditional Access certificate is evaluated to determine if it is expired. One embodiment compares the current time with a time stamp found within the Conditional Access certificate.

DESCRIPTION OF THE INVENTION

Figure 1:
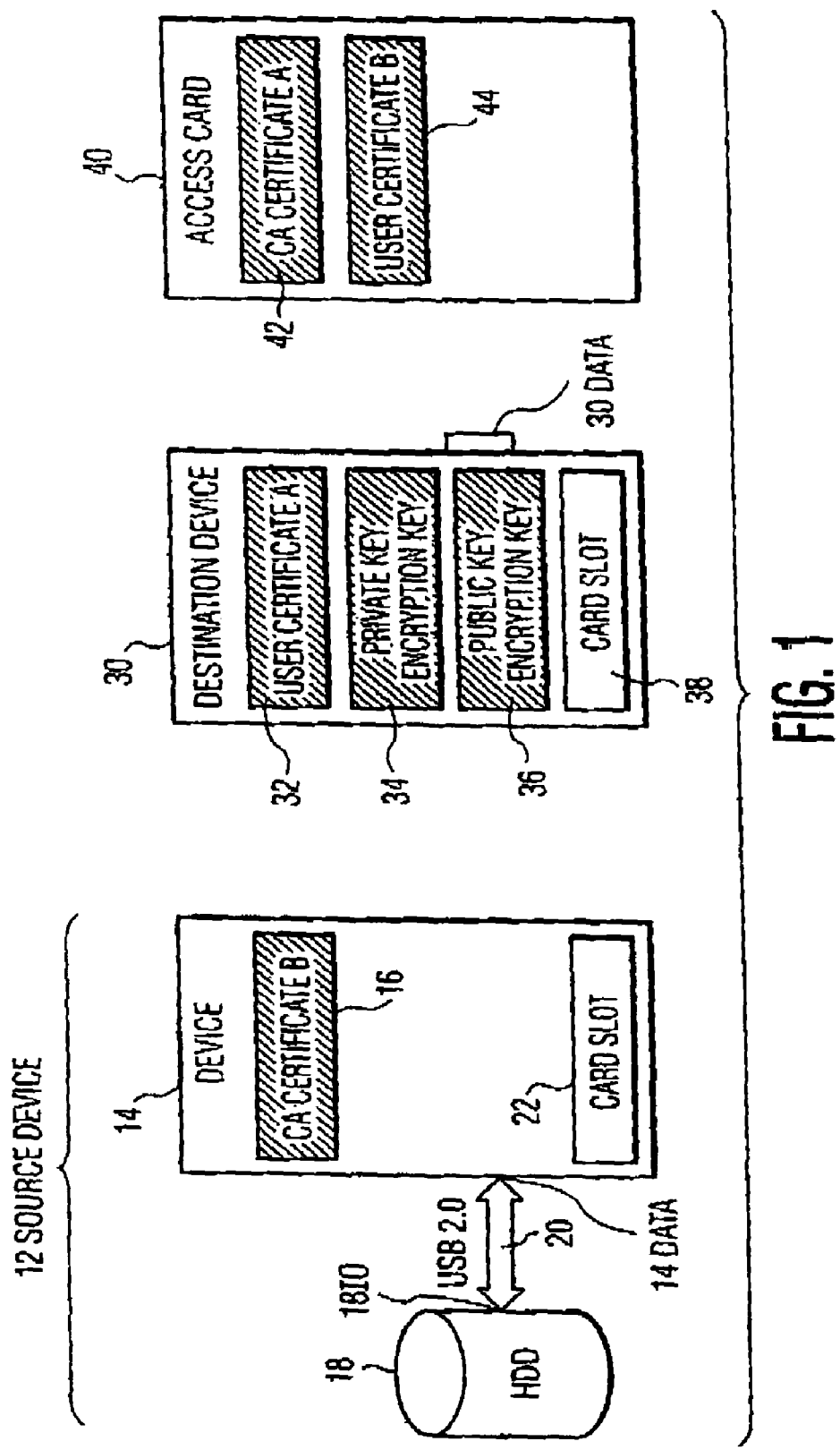
FIG. 1 is a simplified diagram illustrating a digital information source device with removable memory, and a data destination device, together with an access card, all as purchased from a vendor.

FIG. 1 illustrates the individual source device 12, destination device 30, and access card 40 in their as-purchased state. The devices 12 and 30, and the card 40, may be purchased at different times and different locations. As illustrated in FIG. 1, source device 12 includes a device 14 and an associated removable mass memory device 18, designated a hard disk drive (HDD) in this example. The memory 18 is connected to the device 14 by way of a data path 20, which is preferably a high-speed data path such as USB 2.0. Device 14 may be viewed as being a housing with a processor, which accommodates and powers removable memory 18, and provides it with external ports and signals. Such a device might be similar to a Personal Video Recorder such as might be associated with a digital television settop digital receiver, but with the added feature of having the memory removable and transportable independently of the device 14.

As illustrated in FIG. 1, device 14 also includes a card slot 22 and a physically secure memory 16, such as a ROM, preloaded by the vendor with a Conditional Access (CA) Certificate designated as A.

The source device 12 of FIG. 1 can be used by the owner to record audio or video media for reproduction by device 12 for the user's purposes. At some later time, or possibly concurrently with the purchase of the source device 12 of FIG. 1, the owner (or lessee, as the case may be) of source device 12 may acquire or lease a device capable of being loaded with digital media for use at a location remote from source device 12. Such a device might be, for example, a car player for digital audio or video, and it is denominated as destination device 30 in FIG. 1. Destination device 30 includes a card slot 38, and also includes an internal memory 32 which is preloaded with a User Certificate designated as A. Another memory set, designated 34 and 36, within destination device 30 is preloaded with the private and public key portions, respectively, of a key encryption key pair. While not absolutely necessary, it is desirable that the destination device 30 also contain a unique string of characters which allow it to be uniquely identifiable as a non-volatile memory location. Such a unique string might include codes identifying the make, model, and possibly the VIN of the car in which the destination device is located. Finally, destination device 30 includes a data port 30 data which may be a USB 2.0 port. Thus, both the device 14 and the destination device 30 act as independent USB 2.0 hosts in this embodiment.

The owner of the source device 12 and the destination device 30 of FIG. 1 may desire to play the audio or video media stored in memory 18 on his destination device 30. If the digital audio, video or other data content were left unencrypted on the memory 18, an unscrupulous owner could copy the data endlessly and use the data on unauthorized devices. The source device should not store any unencrypted data on memory device 18 which has any value to pirates. According to an aspect of the invention, the user wishing to transfer information from source device 12 to destination device 30 acquires or purchases an access card 40, illustrated in FIG. 1 as including a memory set 42, 44 preloaded with a conditional access (CA) certificate designated A and a User Certificate designated B. While not essential to the invention, the access card as purchased may include a timing function or time identification which allows the card to be used only for a particular period of time. If the time has expired, the source device may prompt the user to purchase a new card.

Figure 2:
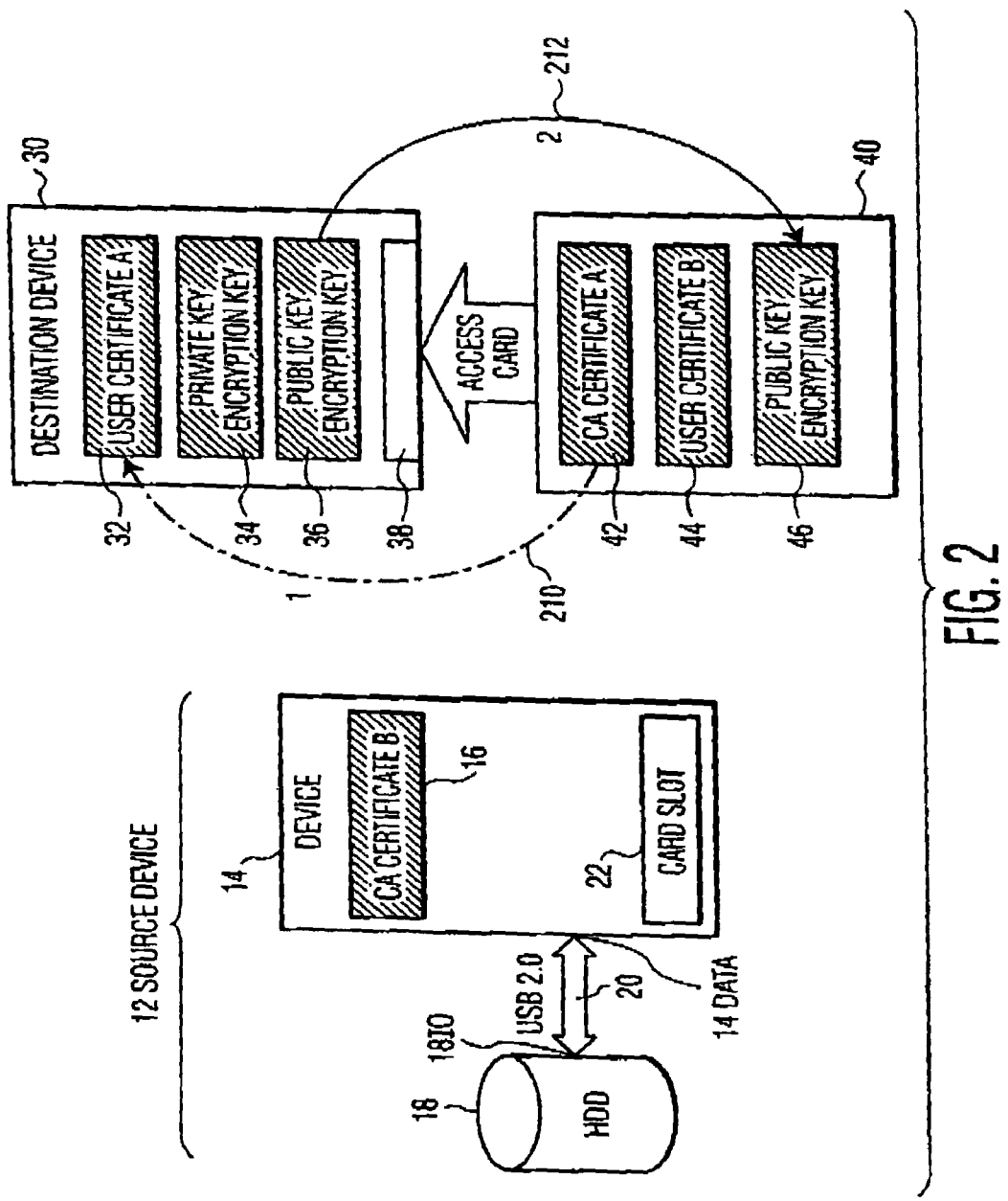
FIG. 2 illustrates the elements of FIG. 1, with the access card plugged into the destination device for authenticating the destination device and for receiving a public key portion of an encryption key.

According to an aspect of the invention, the destination device 30 is identified to the access card by inserting the access card into the slot 38 of the destination device, as illustrated in FIG. 2. A first (1) processing step, illustrated by line 210 in FIG. 2, is to authenticate the destination device by processing the User Certificate A stored in memory 32 of the destination device with the CA Certificate A stored in memory 42 of the access card. As an example, a company will produce or have produced unique company specific Conditional Access certificates, which may be "A" or "B" and also produces physical devices. The physical devices may be as simple as a personal computer with software suited to the method of the invention. The physical devices produce two series of certificates in the form of streams of data of User Certificates on demand. One stream can be validated using Conditional Access Certificate A and the other stream can be authenticated using Conditional Access Certificate B. These User Certificates may each be unique, but have in common the characteristic that, once entered into an authenticating algorithm together with the Conditional Access Certificate, will produce an "authenticated" result, as known in the art. Each of the source, destination, and access card is loaded with User and Conditional Access certificates during manufacture. In one possible use, an "RCA" or "Thomson" access card could be purchased from a retail vendor of electronics equipment.

If the authentication is properly completed, the access card 40 reads the public key portion of the encryption key, stored in memory 36, into a conventional write-once, nonvolatile memory 46 located in the access card 40, as suggested by line 212 of FIG. 2, together or paired with the unique identification string. This step may be considered to be a second processing step (2). The access card is now loaded with information relating to the device for which the data stored in memory 18 is destined, meaning that it has a one-to-one correspondence (i.e., paired) with the destination device. This process of first insertion of the access card need only be performed once to establish the one-to-one correspondence between the destination device and the access card. At the completion of the authentication and loading of the access card associated with the first insertion, the destination device (or even the access card) may give a signal that the process is complete, as by illuminating a light emitting diode (LED) or by other signal.

Figure 3:
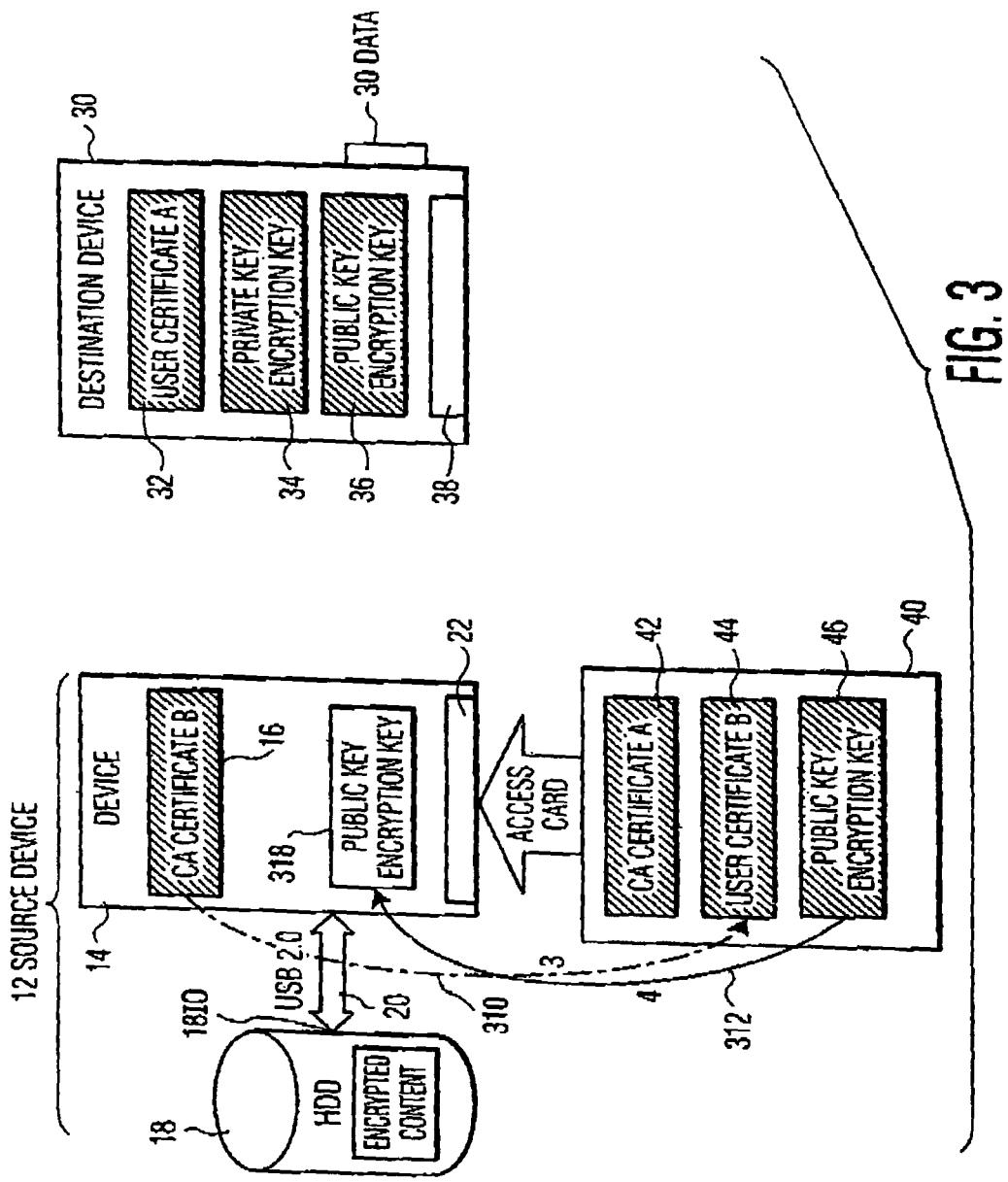
FIG. 3 illustrates the elements of FIG. 1 after the state illustrated in FIG. 2, with the access card plugged into the source device for authenticating the access card by use of a conditional access certificate in the source device, and for loading of the public key portion of the encryption key into the source device.

Following the step illustrated in FIG. 2, the access card is removed from slot 38 of destination device 30, and is transported to, and inserted into, slot 22 of source device 12, as suggested in FIG. 3. According to an aspect of the invention, the User Certificate B stored in memory 44 of access card 40 is read by the source device 12 and processed together with CA certificate B stored in memory 16 of device 14, to authenticate the card 40. This may be considered to be a third (3) processing step, and is illustrated in FIG. 3 by line 310. The authentication step 310 must be performed in device 14. The authentication may include verification that the time limit of the access card is not expired. Following the authentication of the card, the public key encryption key stored in memory 46 of access card 40 is transferred to a memory portion 318 of device 14.

Figure 4:
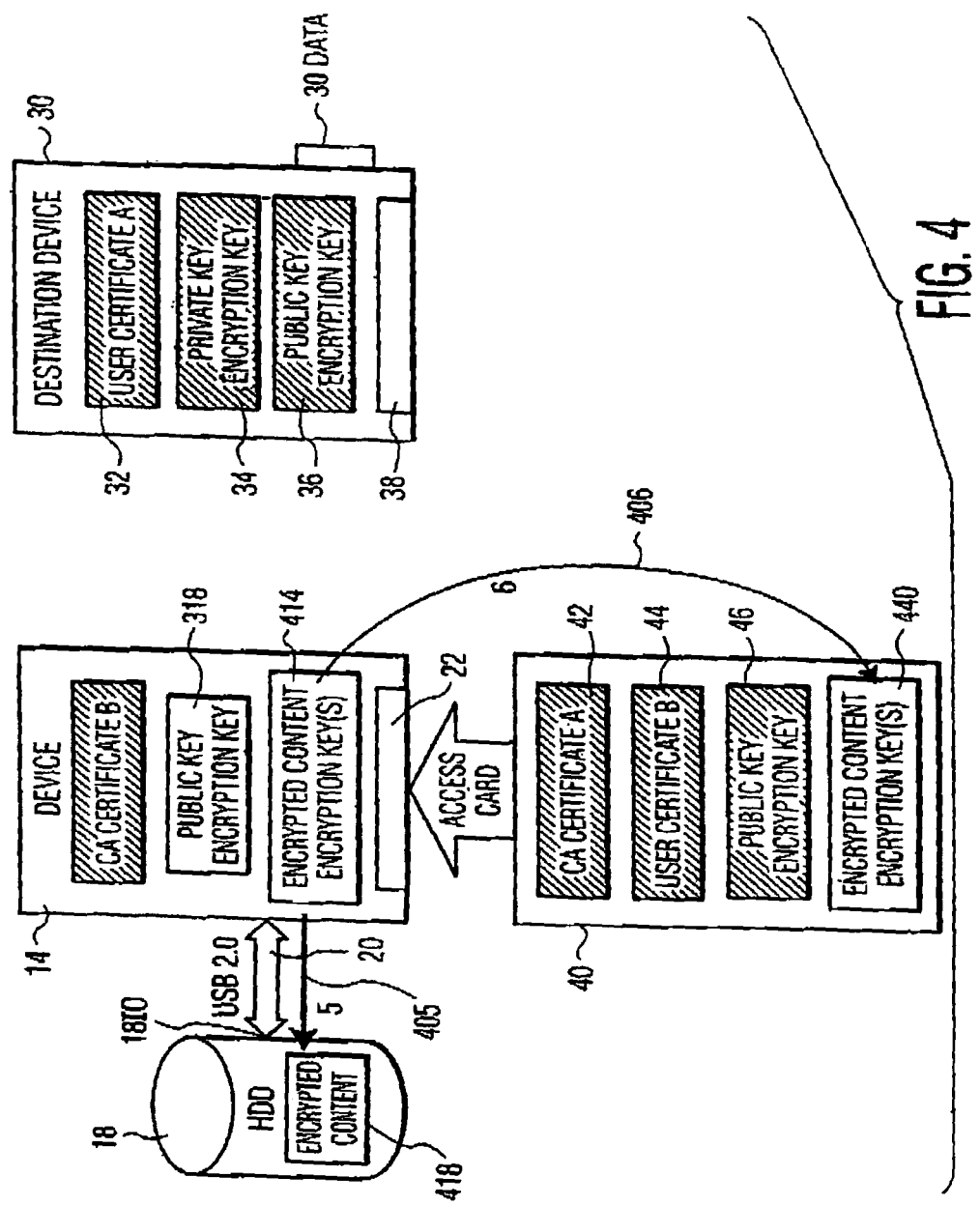
FIG. 4 illustrates the elements of FIG. 1 after the state illustrated in FIG. 3, with the source device encrypting the content of the removable memory, and storing the encrypted content encryption key in the access card.

Following the transfer of the public key portion of the encryption key to memory portion 318, device 14 of FIG. 4 encrypts the data to be stored in memory 18 using its own encryption keys, and loads or returns the encrypted data, illustrated as 418, to the memory 18. This may be viewed as being a fifth (5) processing step, illustrated by a solid line 405 in FIG. 4. It should be noted that different content encoding keys may be used for different portions of the data to be transferred, such as a first content encoding key for the audio, a second for the video, and a third for other data. Alternatively, the content to be transferred may be broken into separate portions, if desired, each encoded with a different content encoding key. The locally generated encryption key(s) is/are at least temporarily stored in a memory portion 414 for the duration of the encryption of the data. The device 14 also encrypts its own content encryption key(s) using the public encryption key stored in memory portion 318, and the content encryption keys so encrypted are written to a memory portion 440 of access card 40 of FIG. 4 as a sixth (6) step, illustrated as a solid line 406. Once the public-key encrypted content encryption keys are transferred to access card 40, the public key (originating from the destination device and transferred via the access card) may be erased from memory portion 318, so that it is later available for use to store the public key of some other destination device, derived from another, different access card.

Figure 5:
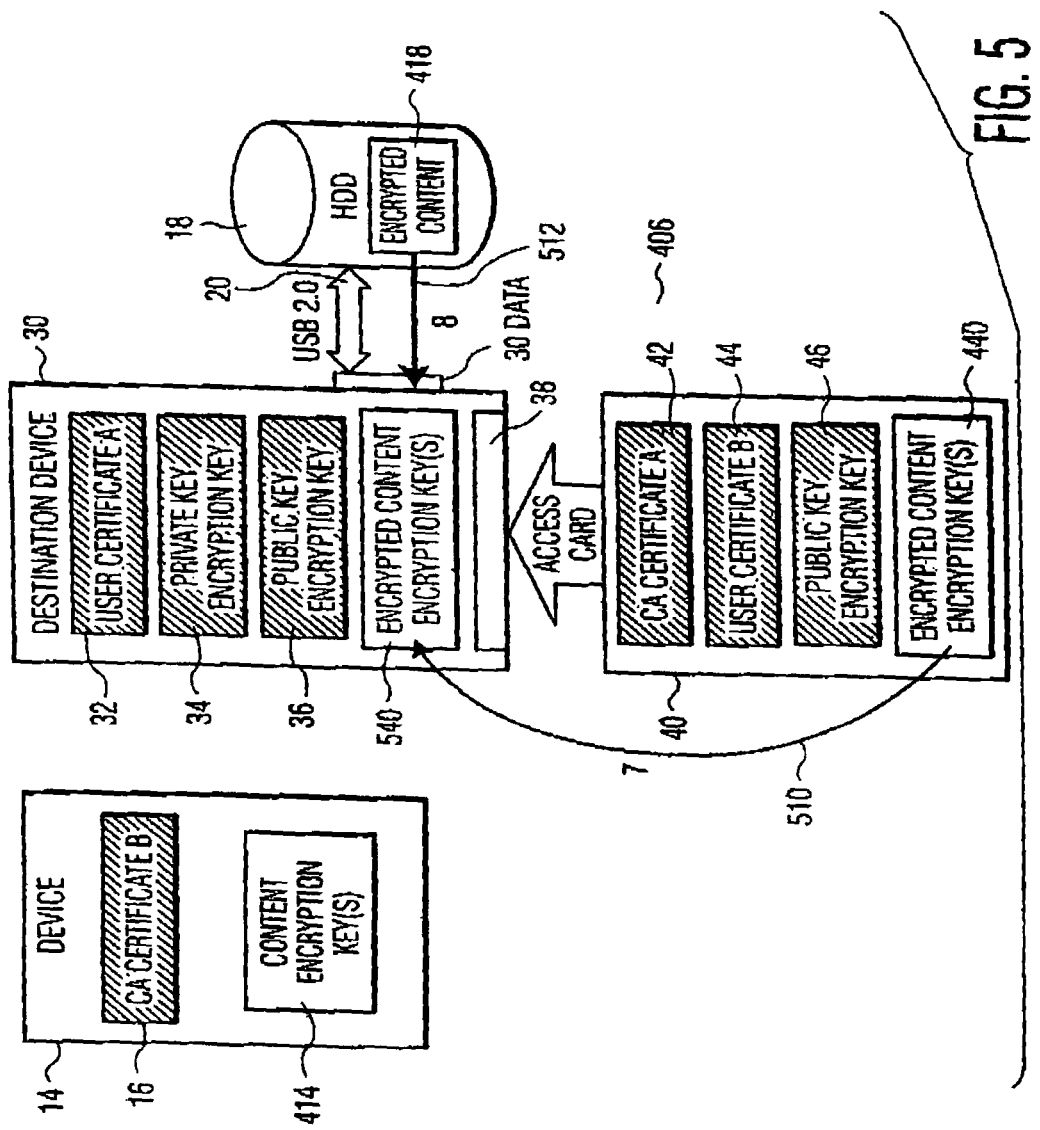
FIG. 5 illustrates the elements of FIG. 1 after the state of FIG. 4, showing the access card again plugged into the destination device for transfer of the encryption key to the destination device, and also showing the memory plugged into the destination device for transfer of the encrypted information to the destination device for decryption by the destination device.

Following the storage in memory 18 of the encrypted data to be transferred to the destination device 30, the memory is moved to the location of the destination device 30, and its data path 20 is connected to data port 30$_{data}$, as illustrated in FIG. 5. The access card is removed from card slot 22 of the device 14, and is moved to destination device 30, and plugged into its card slot 38. This represents a second insertion of the access card 40 into the destination device 30. The encrypted content encryption keys stored in memory 440 of access card 40 are transferred to a memory portion 540 of destination device 30. Destination device 30 uses its private key to decrypt the content encoding key(s) for use in decrypting the encrypted data from memory 18 for playback, display or use.

In operation of the method, the removable access card 40 stores authorization and decryption data which are to be transported from one physical device to another. Information relating to the destination device 30 is stored on the access card 12 which, acting as a proxy, authenticates the destination device 30 to the source device 12. The source device 12, after authenticating that the destination device 30 is from a valid or authorized vendor, can store encrypted content encryption keys on the access card 40 for use by the destination device 30. The destination device can then decrypt the encrypted keys to obtain keys for decryption of the encrypted audio, video or other digital data stored on the separate memory or hard drive.

The access card should authenticate the destination device at first insertion, because an invalid destination device, if it were to be loaded with the content of memory 18, could be used for improper purposes, such as for the making of unauthorized copies. The access card should be authenticated by the source device, to protect against rogue access cards which may have bypassed the authentication of the destination device.

If one were to attempt to use the access card to load some destination device (i.e., a rogue destination device) other than destination device 30 with which the access card is paired, that rogue device would not be able to decrypt the content encryption keys, because its public/private key ensemble is different from that of destination device 30. Thus, after the first insertion, there is a one-to-one pairing between the access card and the associated destination device. Since at least memory portion 46 of the access card 40 is write-once, the card cannot be re-used by inserting it "a first time" into another destination device and overwriting that memory portion. Either the card or the second destination device with which an attempt is made to use the card may advise the user that the card is already paired with the XYZ Video player in your ABC sedan, and cannot be used with the second destination device. This, in turn, requires that the customer purchase another access card in order to load the further destination device.

Because the public key is not distributed with the access card, but is instead written to the access card by the selected destination device at its first insertion, there is not a one-to-one correspondence between an unused or unpaired access card and any destination device. The unused access cards are therefore generic and can be paired with any destination device by the first insertion process. Thus, the access cards can be manufactured without special or individual content. The lack of advanced knowledge of the identity of the destination device reduces the manufacturing cost and the complexity of the distribution process. Avoidance of a pre-sale pairing between access cards and destination devices greatly simplifies the post sale accessory purchase of an access card by a destination device owner. When he later returns to the store to purchase an access card, no one specific card is needed for his device, as any unused card will work.

If an unused or unpaired access card is inserted into the source device, the source device will detect the lack of both a public encryption key and the identification string of a destination device. In this case the source device can provide a message such as "This Access Card must first be inserted into the destination player you plan to load."

The arrangement according to the invention prevents an owner of a source device such as 12 of the FIGURES from using the same card with two or more destination devices such as 30, because the individual destination devices have different encryption codes stored therein, and thus a separate card must be used for each transfer. Only one destination device has the private key which can decrypt the encrypted content encryption keys stored on the digital memory device or card. This is the destination device with which the access card was originally paired during the first insertion operation. Other or rogue destination devices can read the encrypted data and also read the encrypted content encryption keys, but cannot decrypt the encrypted content encryption keys to obtain the content encryption key, and therefore cannot decrypt the encrypted data.

The authentication information on the access card may be set to expire at a given time or after a given interval after first use, thereby requiring customer renewal.

In a particularly advantageous embodiment, the User Certificate of the Access Card is evaluated by the Source Device to determine if it is expired. One embodiment compares the current time with a time stamp found within the User Certificate.

Although the invention has been described in terms of exemplary embodiments, it is not limited thereto. The appended claims should be construed broadly to include other variants and embodiments of the invention which may be made by those skilled in the art without departing from the scope and range of equivalents of the invention.

What is claimed is:

1. A device, comprising:
   a removable digital memory including a port at which digital information stored on said removable digital memory can be accessed;
   a memory for storing first conditional access data and at least one content encryption key;
   a second port for receiving user certificate data and a first key of a key pair contained in a write once memory of an access card that has been paired with a destination device; and
   a processor responsive to the user certificate data received on said second port for authenticating the received certificate data based on the first conditional access data stored in said memory, the processor, upon said authentication, encrypting information stored in said removable digital memory using the at least one content encryption key, to thereby provide encrypted information in said removable digital memory, the processor operable for encrypting said content encryption key using said first key received on said second port and outputting said encrypted content encryption key to enable access of said encrypted information stored on said removable digital memory by an external device.

2. A device according to claim 1, further comprising means for establishing that said access card is not expired.

3. A device according to claim 2, wherein said means for establishing that said access card is not expired is performed by comparing the current time with a timestamp in said received user certificate data.

4. A device according to claim 1, wherein said first key is a public key of a public/private key pair.

5. A device according to claim 1, wherein said access card is inserted into a slot of said device.

6. An access card for enabling secure accessing of digital information stored on a removable memory, the access card comprising:
 a memory having stored therein a first conditional access certificate and a second conditional access certificate;
 a write once memory;
 means for authenticating first and second conditional access certificates with respective first and second certificate data stored on respective destination and source devices;
 said write once memory, following authentication of said card with a destination device, being updated to store a public key of a public/private key pair stored in said destination device to thereby pair the access card with said destination device; and
 a processor operable for, upon authentication of said card with a source device, controlling transmission of said public key to said source device, wherein, in response thereto, said memory being updated to store encrypted data comprising a first key encrypted using said public key, said first key also being used to encrypt information on said removable memory at said source device, whereby communication of said encrypted data to said destination device enables decryption of said data using said private key to recover said first key, to thereby decrypt encrypted information in said removable memory.

7. An access card according to claim 6, further comprising an electronic time stamp.

8. A digital information destination device comprising:
 a digital information input port;
 a digital information decoder coupled to said digital information input port for decoding digital information encoded with a content encoding key, when said content encoding key is available, to thereby produce unencoded digital information;
 memory preloaded with at least a second stored User Certificate and mutually corresponding private and public encryption keys associated with said destination device;
 a content encoding key decryptor for decrypting said content encoding key with a content encoding key encryption key;
 an access card reader for reading an access card, where said access card includes authentication means and a write once memory which, prior to a first insertion in said destination device, includes at least a second Conditional Access Certificate and a first User Certificate and which, after said first insertion, includes at least said public portion of said private and public encryption keys thereby pairing the access card and the destination device and which, prior to a subsequent insertion in said destination device, is inserted into a source device and updated to include a content encoding key encrypted with said key encryption key, whereby said destination device, following said subsequent insertion of said access card, has the key encryption key and can decrypt said content encoding key and, using said content encoding key, decode said digital information encoded with said content encoding key.

9. A method for securely transferring information from a source device to an external device, the source device having a removable digital memory containing information accessible to the source device, the information contained in said digital memory intended to be protected from unauthorized access, the method comprising:
 receiving at the source device user certificate data from an access device that has been paired with a destination device and comparing the user certificate data with a first Conditional Access Certificate stored in memory of said source device for authenticating the certificate data;
 accessing, by said source device, said information stored in said removable digital memory and encrypting said information stored in said removable digital memory using at least one content encryption key stored in said source device, upon authentication of said certificate data;
 receiving at the source device a public key from a write once memory of the access device and encrypting said at least one content encryption key using said public key; and
 transmitting said encrypted content encryption key to enable access of said encrypted information stored on said removable digital memory by an external device communicable with said access device.

10. A method for securely porting digital information from a source device to a destination device comprising:
 providing a source device having a removable digital memory and including a first Conditional Access Certificate;
 providing a destination device having a second stored User Certificate and also including mutually corresponding private and public encryption keys associated with said destination device;
 providing an access card capable of use with both said source device and said destination device, said access card including a second Conditional Access Certificate and a first User Certificate stored therein;
 placing said access card in said access card port of said destination device a first time;
 after said placing of said access card in said destination device a first time, accessing said second User Certificate from said destination device, and, within said access card, authenticating said second User Certificate from said destination device with said second Conditional Access Certificate to determine if said public encryption key should be read from said destination device and stored in said access card;
 if said public encryption key of said destination device should be written to said access card, writing said public encryption key from said destination device to said access card;
 removing said access card from said destination device after said writing of said public encryption key;
 inserting said access card into said source device, and authenticating said first User Certificate with said first Conditional Access Certificate to determine if said access card is valid;
 if said access card is deemed to be valid by said source device, copying said public encryption key from said access card to said source device;
 at said source device, encrypting at least some of said digital information in said digital memory using at least one content encryption key to produce encrypted information, using said public encryption key from said destination device to encrypt said content encryption key to thereby generate at least one encrypted content encryption key, and storing said at least one encrypted content encryption key in said access card;

connecting said port of said digital memory to said digital information port of said destination device;

placing said access card in said access card port of said destination device a second time;

after said step of placing said access card in said access card port of said destination device a second time, copying said at least one encrypted content encryption key from said access card to said destination device, and decrypting said encrypted content encryption key using the private key; and at said destination device, receiving said encrypted information from said digital memory, and using said content encryption key to decrypt said encrypted information.

11. A method according to claim 10, further comprising the step of establishing that said access card is not expired.

12. A method according to claim 11, wherein said step of establishing that said access card is not expired is performed by comparing the current time with a timestamp in said User Certificate.

13. An access card, said access card comprising:
a memory having at various times at least first, second, and third states;
authenticating means;
said memory comprising, in said first state, a second Conditional Access Certificate-and a first User Certificate stored therein;
said memory, in said second state, following a first insertion of said card and first authentication, where said first insertion of said card is into an access card port of a digital information destination device including a digital information port which is capable of receiving said digital information, a second stored User Certificate and mutually corresponding private and public encryption keys associated with said destination device, and said first authentication is performed by said authenticating means authenticating said second User Certificate from said destination device with said second Conditional Access Certificate, comprising said public encryption key from said destination device;
said memory, in said third state, following a second insertion of said card and second authentication, where said second insertion of said card is into an access card port of a digital information source device including a removable digital memory containing digital information and a further memory containing a first Conditional Access Certificate and at least one content encryption key, and also following authentication of said first User Certificate stored in said memory of said access card with said first Conditional Access Certificate stored in said source device to establish validity of said access card to said source device, comprising said at least one content encryption key encrypted with said public encryption key.

* * * * *